(12) United States Patent
Nagakari et al.

(10) Patent No.: US 6,282,079 B1
(45) Date of Patent: Aug. 28, 2001

(54) CAPACITOR

(75) Inventors: Shoken Nagakari, Kagoshima; Shigeo Konushi, Kokubu; Akihiro Sadakane, Kitami, all of (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/451,620

(22) Filed: Nov. 30, 1999

(30) Foreign Application Priority Data

Nov. 30, 1998 (JP) .................................................. 10-340752

(51) Int. Cl.$^7$ ............................ H01G 4/005; H01G 4/228
(52) U.S. Cl. .................. 361/303; 361/306.1; 361/306.3; 361/309
(58) Field of Search .............................. 361/306.1, 306.2, 361/306.3, 307, 308.1, 309–310, 321.2, 321.5

(56) References Cited

U.S. PATENT DOCUMENTS

| | | | |
|---|---|---|---|
| 4,831,494 | * 5/1989 | Arnold et al. ..................... | 361/306.1 |
| 5,880,925 | 3/1999 | DuPre et al. ..................... | 361/303 |
| 6,072,687 | * 6/2000 | Naito et al. ..................... | 361/303 |

* cited by examiner

*Primary Examiner*—Anthony Dinkins
(74) *Attorney, Agent, or Firm*—Hogan & Hartson, L.L.P.

(57) ABSTRACT

On the periphery of a polygonal main body formed by alternately placing electrode plates and dielectric layers, the electrode plates being alternately first and second electrode plates from the bottom, a plurality of first terminal electrodes connected with the first electrode plate and a plurality of second terminal electrodes connected with the second electrode plate are alternately formed. The first terminal electrodes or second terminal electrodes are provided at the corners of the main body. And the first terminal electrodes lies after the second terminal electrodes in a peripheral direction in a plan view of the capacitor. This capacitor can have a large capacitor and a low impedance in a wide frequency region.

21 Claims, 10 Drawing Sheets

CAPACITOR

This application is based on patent application Nos. 10-258479 and 10-340752 filed in Japan, the contents of which are hereby incorporated by references.

BACKGROUND OF THE INVENTION

This invention relates to a capacitor, particularly to a capacitor of large capacitance and low impedance, which is provided in, for example, a high-speed digital circuit and used to bypass a high frequency noise or to prevent the supply voltage from varying.

As electronic apparatus have become smaller and acquired more functions, electronic parts provided therein have been strongly demanded to be smaller and thinner and have a good high frequency characteristic.

Particularly in a high-speed digital circuit of a computer which is required to process a huge amount of information at high speed, clock frequencies are remarkably high even at a personal computer level: 400 MHz to 1 GHz in a CPU chip and 75 MHz to 100 MHz in a bus between chips.

Further, as the integration of LSIs has been enhanced and the number of devices in a chip has increased, there has been an ongoing tendency to reduce the supply voltage in order to suppress power consumption. As these IC circuits have come to process at higher speed and have a higher density and a lower supply voltage, it has become essential for passive parts such as capacitors to have a smaller size, a larger capacity and an excellent characteristics to high frequencies or high-speed pulses.

In order to construct a capacitor of smaller size and larger capacity, it is most effective to reduce the thickness of a dielectric layer tightly held between a pair of electrodes. This thickness reduction is compatible with the aforementioned tendency to decrease the supply voltage.

On the other hand, various problems caused by the high-speed operation of the ICs are more serious than the miniaturization of the respective devices. In the function of the capacitor to remove high-frequency noises, it is particularly important to suppress occurrence of an instantaneous voltage drop which occurs when logic circuits have switched by instantaneously supplying an energy stored in the capacitor (so-called "decoupling capacitor").

The performance required for the decoupling capacitor is to supply a current in response to a current regulation in load more quickly than a clock frequency. Accordingly, this capacitor has to securely fulfill its function in a frequency region of 100 MHz to 1 GHz.

However, the capacitor actually has a resistance and an inductance in addition to a capacitance. The capacitive impedance decreases as the frequency increases, whereas the inductive impedance increases as the frequency increases. Thus, as the operating frequency becomes higher, the inductance of the capacitors restricts a transit current that should be supplied to a logic circuit, thereby causing an instantaneous voltage drop in the logic circuit or a new voltage noise and, as a result, an error in the logic circuit. Particularly, in recent LSIs, the supply voltage decreases to suppress an increase in power consumption due to an increased total number of devices in the logic circuit, and a permissible regulation range of the supply voltage becomes small. Accordingly, in order to suppress the voltage variation range during the high-speed operation to a minimum level, it is very important for the decoupling capacitor to reduce the impedance thereof also in a high-frequency region and to possess a performance of instantaneously supplying the stored electric charges as a necessary current.

A standard for the impedance reduction is to suppress a regulation of 40 mA/ns per driver as disclosed in "Computing Inductive Noise of CMOS Drivers" by A. J. Rainal, IEEE Trans. Comp., Packag., Manufact. Technolo.-Part B, Vol. 19, pp. 789–802 (1996). If a supply voltage is 1.8 V, a permissible range of voltage regulation is 10% of the supply voltage, i.e., 0.18V, and the number of off-chip drivers is 64, an upper limit of inductance is 0.14 nH and impedance at 1 GHz must not exceed about 0.4Ω.

In order to minimize the impedance of the capacitor in a necessary frequency region, the capacitance of the capacitor itself may be increased while the resistance and the inductance of the capacitor are reduced, or the electrostatic capacity may be so reduced as to conform a resonance frequency $f0=1/[2\pi(ESL \cdot C)^{1/2}]$ determined by an equivalent serial inductance ESL and an electrostatic capacity C to a necessary frequency.

For the electrostatic capacity, the former technique can be most effectively applied by thinning the dielectric layer tightly held between the electrodes as described above. The resistance component is determined by a dielectric loss of the dielectric layer and the resistance of the electrodes. The resistance of the electrodes can be thought to be a substantially constant value apart from a skin effect which becomes eminent in a frequency region above several GHz.

As manners of reducing the inductance, there are a manner of minimizing the length of a current path, a manner of making current paths having loops and minimizing the area of a loop, and a manner of splitting the current path into n paths to reduce the effective inductance to 1/n.

Although attempts have been made to reduce the inductance of the capacitor and the impedance of the capacitors by the above methods, an operable frequency region at an impedance of 0.4Ω or below is only around the resonance frequency determined by the electrostatic capacity and the inductance of the capacitor. If the capacitor is used by reducing the capacity in a frequency region above the resonance frequency, it can function only in a small range of an order of ten MHz from the resonance frequency.

As a method for realizing a capacitor which functions at a low impedance in a wide frequency region by overcoming the above problem that impedance can be reduced only in a region around the resonance frequency, it may be considered to connect capacitance having different capacities in parallel. For example, an attempt to obtain a capacitor having a large capacitance and an excellent high frequency characteristic by arranging in parallel a plurality of dielectric materials having different dielectric constants is disclosed in Japanese Unexamined Patent Publication No. 6-77083.

For a multi-layer ceramic capacitor, an attempt has been made, as disclosed in Japanese Unexamined Patent Publication No. 8-162368, to develop a noise removing function in a wide frequency region by promoting a low impedance at a resonance point of these two capacitors, with changing the areas of electrodes and the thickness of a dielectric layer in one capacitor, and connecting two capacitors having different capacitances.

Japanese Unexamined Patent Publication No. 9-246098 discloses an attempt to develop a noise removing function in a wide frequency region as above by forming electrodes in the respective layers such that the respective capacities differ from each other and connecting the respective stages in parallel via inductors.

U.S. Pat. No. 5,880,925 discloses a capacitor which including pairs of rectangular electrode plates and rectangular dielectric layer placed between the electrode plates, each rectangular electrode plate having electrode leads on the opposite longer sides. The electrode leads of one of each pair of electrode plates and the electrode leads of the other are alternately arranged on the longer side when viewed above. In this construction, a current from one electrode plate splittingly flows into another electrode. Also, there are formed looped current paths one of which allows the current to flow in a direction opposite to its adjacent looped paths. Accordingly, this capacitor can reduce the inductance.

However, in the thin film capacitor disclosed in Japanese Unexamined Patent Publication No. 6-77083, an equivalent circuit is identical to a single capacitor even if the dielectric layer is divided in a plane while the capacitor has only a pair of terminal electrodes. Thus, only the parallel effect of the dielectric characteristics of the materials, but no effect in the equivalent circuit can be thought to be seen.

The parallel capacitor disclosed in Japanese Unexamined Patent Publication No. 8-162368 is a parallel circuit in the equivalent circuit. However, no large effect by the parallel connection can be obtained if the inductance of the two capacitors in the chip is large. Further, since currents of the same direction flow into the two capacitors in this construction, a mutual inductance of the two capacitors becomes larger. As a result, the effect of the parallel connection cannot be expected.

In the capacitor disclosed in Japanese Unexamined Patent Publication No. 9-246098 in which the inductor is inserted between the parallelly connected capacitors, impedance becomes higher, which results in an undesired increased inductance of the device as a whole. A more critical problem is that a point of maximum impedance due to parallel resonance is present between the respective resonance points and impedance cannot be reduced in a wide frequency region at and above 100 MHz unless this parallel resonance is suppressed.

The capacitor of U.S. Pat. No. 5,880,925, which is provided with electrode leads on the longer sides of an electrode plate, can attain some parallel current paths. Also, this capacitor allows the current to flow in the opposite directions on the adjacent looped paths, thereby reducing the inductance. However, this capacitor does not utilize the electrode plate uniformly. Accordingly, the inductance reduction is not satisfactorily accomplished.

SUMMARY OF THE INVENTION

It is an object of the present invention to provide a capacitor which has overcome the problems residing in the prior art.

According to an aspect of the invention, a capacitor includes a pair of first and second electrode plates each having the form of a polygon and a plurality of electrode leads on their respective peripheries. There is provided a dielectric layer between the first and second electrode plates. The plurality of electrode leads of the second electrode plate are shifted from the plurality of electrode leads of the first electrode plate so that each electrode lead of the second electrode plate lies after each electrode lead of the first electrode plate in a peripheral direction in a plan view. The electrode leads of the first electrode plate are respectively connected by first terminal electrodes, and the electrode leads of the second electrode plate are respectively connected by second terminal electrodes.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
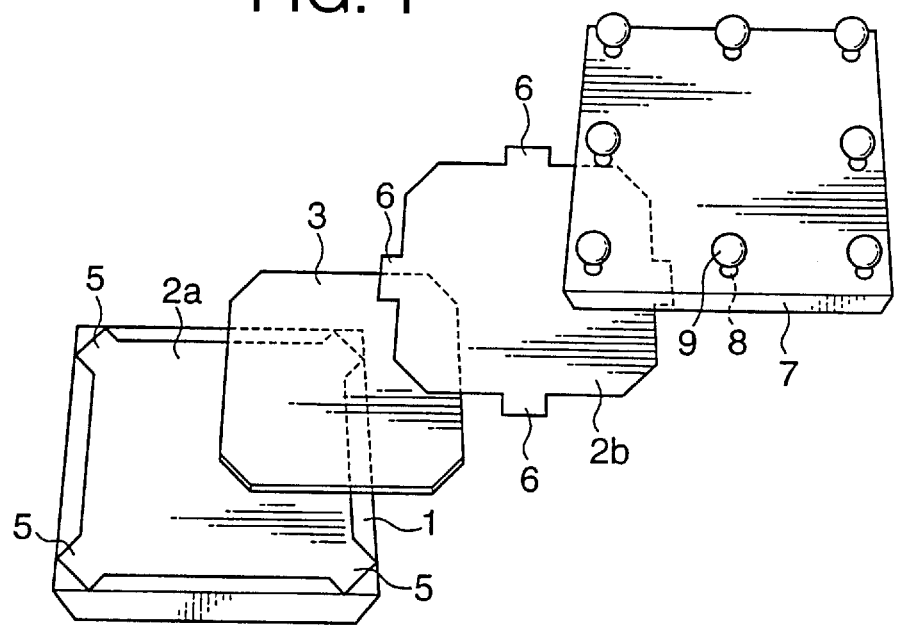
FIG. 1 is an exploded perspective view of a first capacitor embodying the invention.

The present invention is applicable not only to thin type capacitors such as single-plate capacitors but also to thick type capacitors such as multi-layer chip capacitors. The respective types of capacitor will be described.

FIGS. 1 to 4 show a thin type capacitor having a single plate. This capacitor includes an insulating substrate 1, a first electrode plate 2a placed on the substrate 1, a dielectric layer 3 placed on the first electrode plate 2a, and a second electrode plate 2b placed on the dielectric layer 3. These members are generally in the form of a square.

Four first terminal electrodes 5 are connected with a periphery of the first electrode plate 2a and four second terminal electrodes 6 are connected with a periphery of the second electrode plate 2b. The first terminal electrodes 5 and the second terminal electrodes 6 are alternately arranged in a peripheral direction The first terminal electrodes 5 are arranged at the corners of the first electrode plate 2a. The second terminal electrode 6 are respectively arranged on side lines x connecting adjacent two first terminal electrodes 5 at corners and at middle positions between the adjacent two terminal electrodes 5. A main body 4 is defined as a portion where the dielectric layer 3 are tightly held by the first and second electrode plates 2a, 2b, i.e., a portion where a capacitance is actually produced. The first and second terminal electrodes 5, 6 are provided around the main body 4, i.e., extending outward from the main body 4.

It is better to make the distance D1 between the adjacent first and second terminal electrodes 5 and 6 as short as possible. However, it is preferable the distance D1 is made to be 1.5 mm or shorter in view of the actual outer size of the capacitor and the inductance of the entire capacitor. The distance greater than 1.5 mm makes the entire capacitor to have an increased inductance and a larger size. On the other hand, the distance D1 is preferably 0.2 mm or greater in view of easiness to fabricate.

Figure 3:
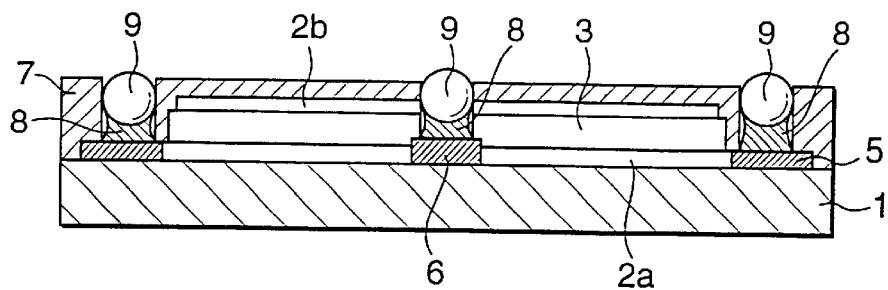
FIG. 3 is a sectional view of the first capacitor, taken along the line 3—3 in FIG. 2.
Figure 4:
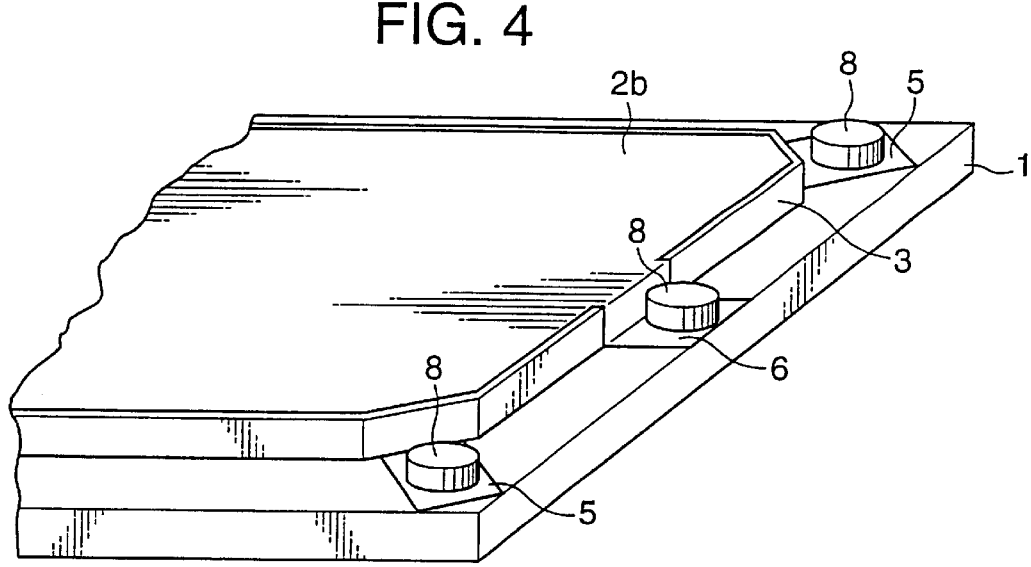
FIG. 4 is a partial perspective view of the first capacitor of FIG. 1 without the protection layer.

On the insulating substrate 1, a protection layer 7 made of a photo-sensitive resin, $SiO_2$ or the like is so formed as to cover the main body 4, the first terminal electrodes 5 and the second terminal electrodes 6 as shown in FIG. 1. As shown in FIGS. 3 and 4, viahole conductors 8 are formed inside the protection layer 7. These viahole conductors 8 are made of, e.g., silver-palladium (Ag—Pd) alloy, solder or gold, and connected with the first and second terminal electrodes 5, 6. External terminal electrodes 9 are formed on upper surfaces of these viahole conductors 8 for connection with an electric board or the like. The external terminal electrodes 9 may be formed by a known technique such as solder bumps made of solder balls or solder paste, screen printing of Ag—Pd alloy paste, Ni-Solder plating, or Ni—Sn plating. Further, the viahole conductors 8 may be formed in viaholes from the same material as the external terminal electrodes 9 at the same time the external terminal electrodes 9 are formed.

The insulating substrate 1 may be made of alumina, sapphire, aluminum nitride, MgO monocrystals, $SrTiO_3$ monocrystals, surface silicone oxide, glass, quartz, or the like.

As the material for the electrode plates 2a, 2b and the terminal electrodes 5, 6, platinum (Pt), gold (Au), silver (Ag), palladium (Pd), cupper (Cu) or nickel (Ni) having a low resistance, or the like can be suitably used. Any of these materials may be used as far as its reactivity with the dielectric layer 3 is acceptably small. The electrode plates 2a, 2b and the terminal electrodes 5, 6 are formed by a known technique such as vacuum deposition or sputtering.

As the material for the dielectric layer 3 may be used any which has a high dielectric constant in a high frequency region. There may be a dielectric made of perovskite-type crystals containing Pb Mg, Nb; PZT; PLZT; $BaTiO_3$; $SrTiO_3$; $Ta_2O_5$; or compounds obtained by addition of an other metal oxide to the above-mentioned compounds or by substitution of an other metal oxide. Further, in the case of the thin type, the thickness of the dielectric layer 3 is preferably 0.3 to 1.0 $\mu$m, more preferably 0.4 to 0.8 $\mu$m, in order to ensure a high capacitance and a high insulation.

Figure 2:
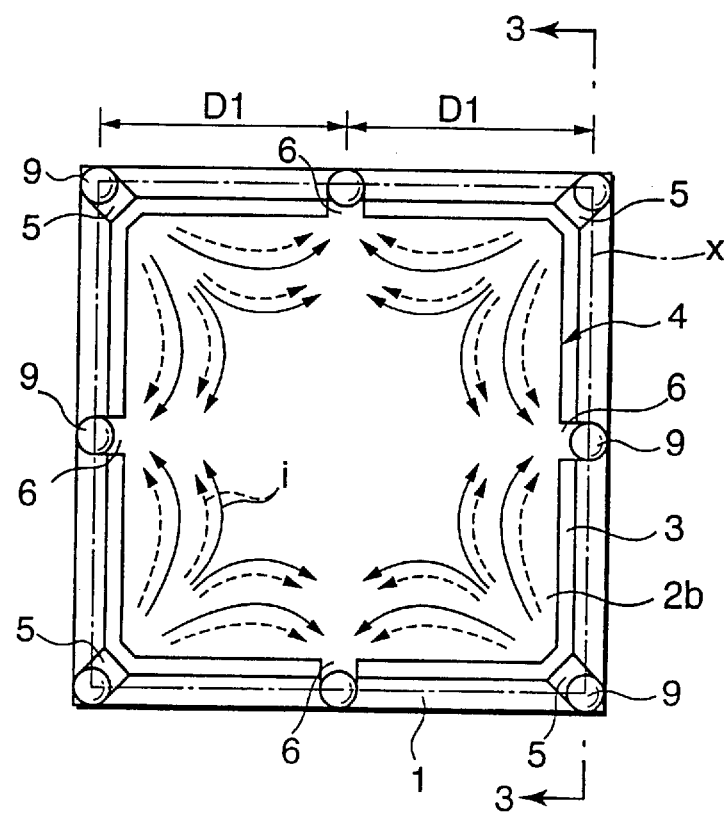
FIG. 2 is a plan view of the first capacitor of FIG. 1 without a protection layer.

In the capacitor constructed as above, a current splittingly flows into the four first terminal electrodes 5 via the external terminal electrodes 9 as shown in FIG. 2. The current from one first terminal electrode 5 flows to two neighboring second terminal electrodes 6, but hardly flows to the remaining second terminal electrodes 6. Further, in the case that the first and second terminal electrodes 5, 6 are provided close to each other, the flowing path of the current to the second terminal electrode 6 provided between the one and the other first terminal electrodes 5 can be reversed by the one and the other first terminal electrodes 5. Therefore, the current flowing path can be securely split and an effective inductance can be reduced without causing any mutual interference between the first terminal electrodes 5.

Since four capacitors each comprised of one first terminal electrode 5 and the two second terminal electrodes 6 adjacent thereto are formed by the pair of electrode plates 2 and the dielectric layer 3, it seems to be a circuit in which four capacitors are connected in parallel. Thus, a low impedance characteristic can be obtained in a wide frequency region by the aforementioned splitting effect and the parallel connection.

Further, by providing each second terminal electrode 6 in the middle of the line x connecting the corresponding pair of first terminal electrodes 5, the second terminal electrode 6 becomes equidistant from the pair of first terminal electrodes 5, thereby equaling the intensities of the current flowing from the first terminal electrode 5 to the second terminal electrodes 6. As a result, the above splitting effect can be further improved. Furthermore, the main body can be easily mounted on a circuit board since the respective terminal electrodes 5, 6 are equidistant from each other.

FIGS. 5 to 10 show a multi-layer chip capacitor of thick type according to a second embodiment of the invention. This capacitor includes a main body 12 having a square cross section which is formed by alternately laminating two first electrode plates 10a, two second electrode plates 10b, and three dielectric layers 11. Dielectric layers which do not essentially form a capacitance are placed on the top and bottom of the main body 12. The main body 12 also refers to a portion where the dielectric layers 11 are tightly held by the electrode plates 10a and 10b, i.e., a portion where a capacitance is actually produced. In this case, the thickness of the dielectric layers 11 is not particularly specified, if it is from several pm to an order of 10 μm. The material for the dielectric layers 11 may be the same as the one used for the dielectric layer 3 in the first embodiment.

Specifically, the material for the dielectric layers 11 is not particularly specified, if it has a high dielectric constant in a high frequency region. This material may be a dielectric made of perovskite-type crystals containing Pb Mg, Nb; PZT; PLTZ; $BaTiO_3$; $SrTiO_3$; $Ta_2O_5$; or compounds obtained by addition of an other metal oxide to the former compounds or by substitution of an other metal oxide.

Figure 5:
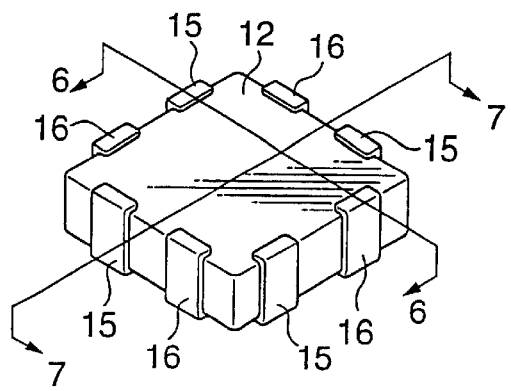
FIG. 5 is a perspective view showing an outer configuration of a second capacitor embodying the invention.
Figure 6:
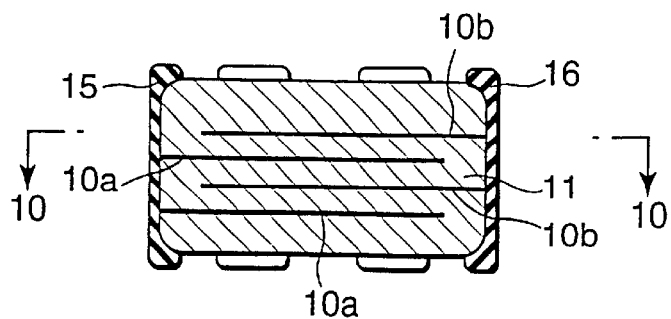
FIG. 6 is a sectional view of the second capacitor, taken along the line 6—6 in FIG. 5.
Figure 7:
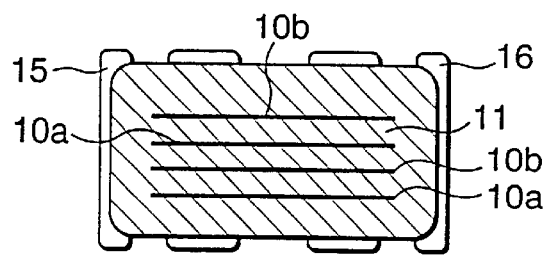
FIG. 7 is a sectional view of the second capacitor, taken along the line 7—7 in FIG. 5.

On the periphery of the main body 12 are formed first external terminal electrodes 15 connected with the first electrode plates 10a and second external terminal electrodes 16 connected with the second electrode plates 10b as shown in FIG. 5. A pair of first and second external terminal electrodes 15, 16 are formed on each side of the main body 12. In other words, a total of four first external terminal electrodes 15 and a total of four first external terminal electrodes 16 are provided. Further, the respective first and second external terminal electrodes 15, 16 are so formed as to extend over three surfaces: from the front surface to the rear surface over the end surfaces, and have a U-shaped cross section as shown in FIGS. 6 and 7.

A distance D2 between one first external terminal electrode 15 (or one second external terminal electrode 16) and the second external terminal electrode 16 (or the first external terminal electrode 15) located on the same side is equal to a distance D2 between this first external terminal electrode 15 (or this second external terminal electrode 16) and the second external terminal electrode 16 (or the first external terminal electrode 15) located on another side and adjacent to this first external terminal electrode 15 (or this second external terminal electrode 16).

Figure 8:
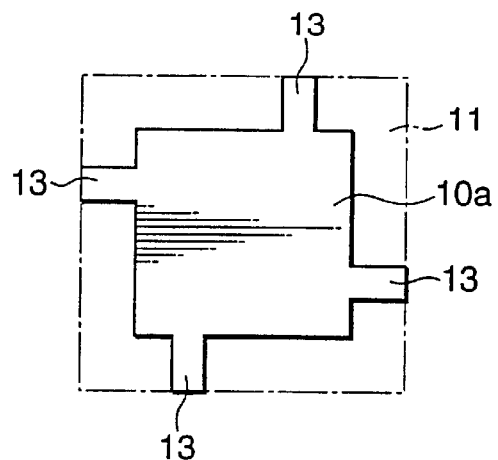
FIG. 8 is a plan view showing a first electrode plate of the second capacitor.
Figure 9:
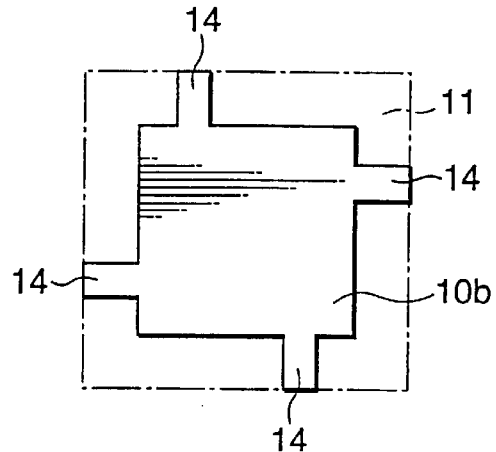
FIG. 9 is a plan view showing a second electrode plate of the second capacitor.

Further, as shown in FIG. 8, the first electrode plate 10a has four first electrode leads (corresponding to the terminal electrodes of FIGS. 1 to 4) 13 which extend to the four sides of the main body 12 and are connected with the first external terminal electrodes 15. On the other hand, as shown in FIG. 9, the second electrode plate 10b has four second electrode leads (corresponding to the terminal electrodes of FIGS. 1 to 4) 14 which extend to the four sides of the main body 12 and are connected with the second external terminal electrodes 16.

Accordingly, when the first electrode leads 13 of the first electrode plate 10a and the second electrode leads 14 of the second electrode plate 10b are viewed in a horizontal plane, the distance D2 between one first electrode lead 13 (or one second electrode lead 14) and the second electrode lead 14 (or the first electrode lead 13) located in the same side is equal to the distance D2 between this first electrode lead 13 (or this second electrode lead 14) and the second electrode lead 14 (the first electrode lead 13) located in an other side and adjacent to this first electrode lead 13 (or this second electrode lead 14). Therefore, if the ends of the adjacent external terminal electrodes (electrode leads) are connected by a line without distinguishing the first and second external terminal electrodes (or electrode leads), a regular octagon can be formed in plan view.

As the material for the electrode plates 10a, 10b and the first and second electrode leads 13, 14, platinum (Pt), gold (Au), silver (Ag), palladium (Pd), cupper (Cu) or nickel (Ni) having a low resistance, or the like can be suitably used. This material is not particularly specified, if it has a small degree of reactivity with the dielectric layers 11, and the electrode plates 10a, 10b and the first and second electrode leads 13, 14 can be formed by a known technique such as sputtering.

Further, the material for the first and second external terminal electrodes 15, 16 may be silver (Ag), silver-palladium (Ag—Pd) alloy, or the like. The external terminal electrodes 15, 16 may be formed by a known technique by applying Ni-solder plating or Ni—Sn plating to baked material selected from the above.

Figure 10:
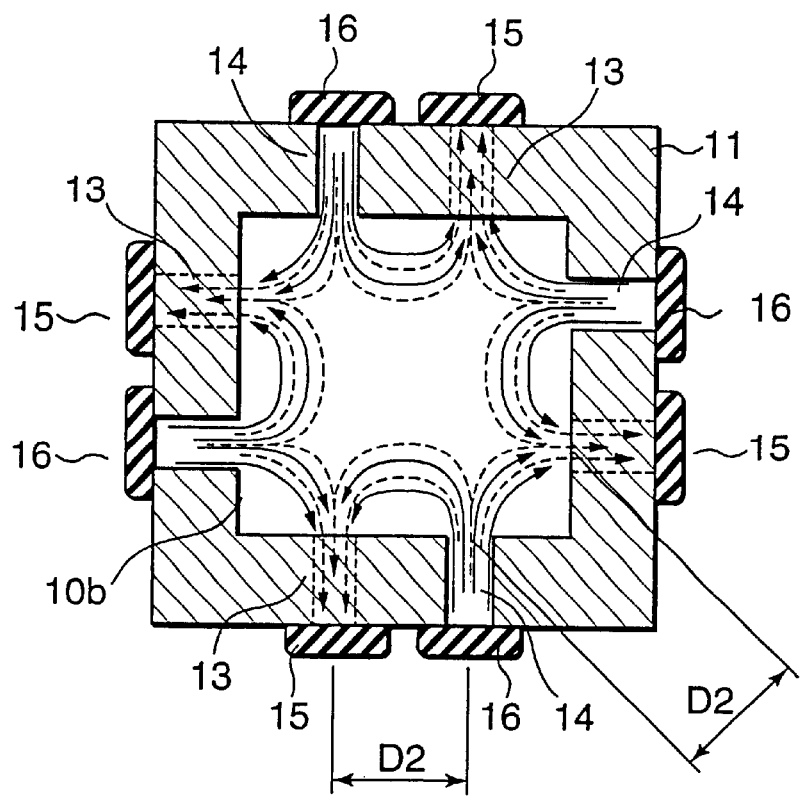
FIG. 10 is a sectional view of the second capacitor, taken along the line 10—10 in FIG. 6, and showing paths of a current supplied to the second capacitor when viewed from above.

In the capacitor constructed as above, for example, a current supplied to each second electrode plate 10b splittingly flows to the second electrode leads 14 via the four second external terminal electrodes 16 as shown in FIG. 10. The current flown into one second electrode lead 14 flows further to the two neighboring first electrode leads 13, but hardly flows to the remaining first electrode leads 13. Thus, even in the case that the first and second electrode leads 13, 14 are provided close to each other, the path of the current into the first electrode lead 13 provided between the one and the other second electrode leads 14 can be reversed by the one and the other second electrode leads 14. Therefore, the current path can be securely split and the effective inductance can be reduced without causing any mutual interference between the second electrode leads 14.

Further, since the four capacitors each comprised of one first electrode lead 13 and the two second electrode leads 14 adjacent thereto are formed by the pair of electrode plates 10a, 10b and the dielectric layer 11, it seems to be a circuit in which four capacitors are connected in parallel. Thus, a low impedance characteristic can be attained in a wide frequency region by the aforementioned splitting effect and the parallel connection.

Furthermore, by setting the distances between the second external terminal electrodes 16 (or the first external terminal electrodes 15) and their neighboring first external terminal electrodes 15 (or their neighboring second external terminal electrodes 16), i.e., the distances between the second electrode leads 14 (or first electrodes 13) and their neighboring first electrode leads 13 (or their neighboring second electrode leads 14) equal to each other, the intensities of the currents flowing from the second electrode leads 14 to the first electrode leads 13 are made to be equal to each other, thereby further improving the above splitting effect. Further, in this case, the main body can be easily mounted on an other substrate since the respective external terminal electrodes 15, 16 are equidistant from each other.

Figure 14:
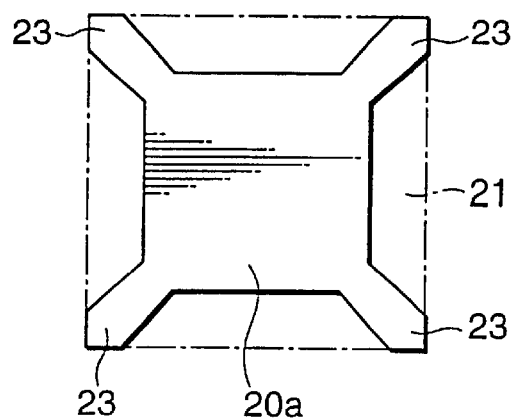
FIG. 14 is a plan view showing a first electrode plate of the third capacitor.
Figure 15:
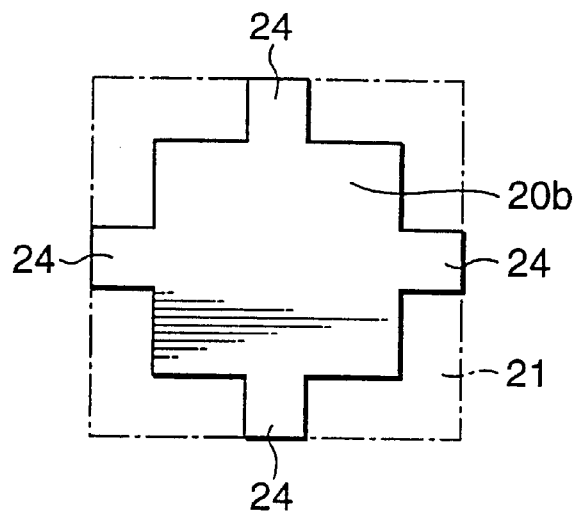
FIG. 15 is a plan view showing a second electrode plate of the third capacitor.

FIGS. 11 to 16 show a multi-layer chip capacitor of thick type according to a third embodiment of the invention. The third embodiment differs from the second embodiment in the arrangement of the first and second external terminal electrodes. In the third embodiment, first external terminal electrodes 25 are provided at the corners of a main body 22, and second external terminal electrodes 26 are provided in the middle of lines connecting pairs of neighboring first external terminal electrodes 25. Accordingly, the respective second external terminal electrodes 26 are equidistant from their neighboring first external terminal electrodes 25. A first electrode plate 20a has four first electrode leads (corresponding to the terminal electrodes of FIGS. 1 to 4) 23 extending to the respective corners of a dielectric layer 21 as shown in FIG. 14, whereas a second electrode plate 20b has four second electrode leads (corresponding to the terminal electrodes of FIGS. 1 to 4) 24 extending to the middles of the respective sides of the dielectric layer 21 as shown in FIG. 15.

The material for the electrode plates, the dielectric layers and the external terminal electrodes may be the same as those used in the second embodiment.

Figure 16:
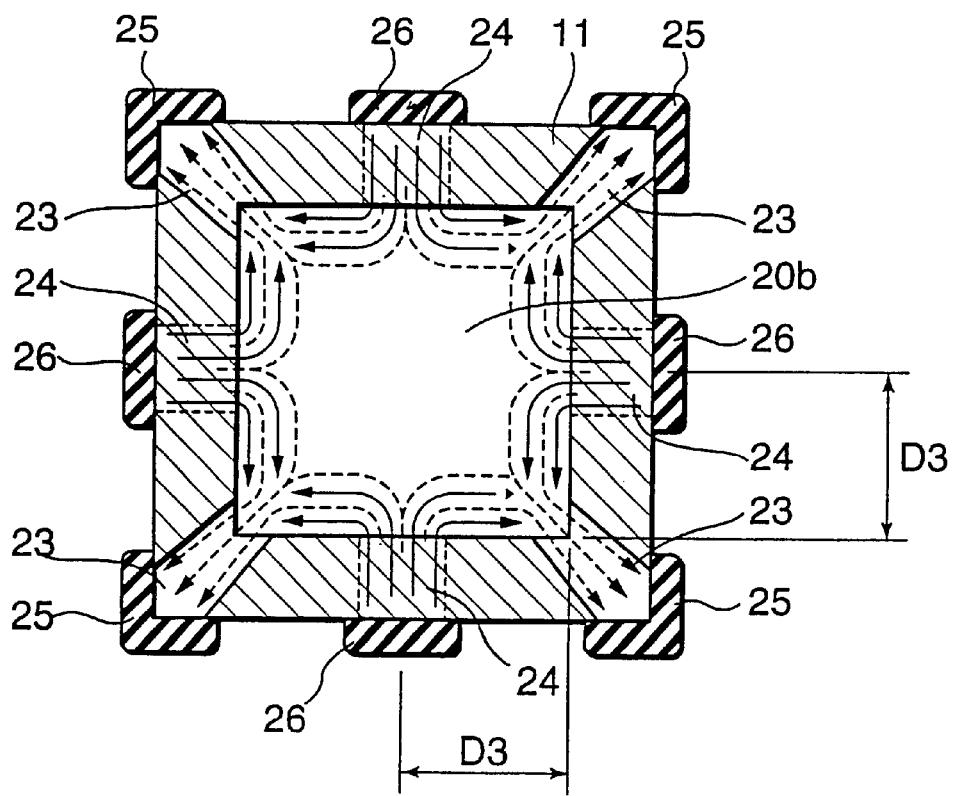
FIG. 16 is a sectional view of the third capacitor, taken along the line 16—16 in FIG. 12, and showing paths of a current supplied to the third capacitor when viewed from above.

In the capacitor constructed as above, for example, a current splittingly flows into the four second electrode leads 24 via the second external terminal electrodes 26 in plan view as shown in FIG. 16. The current flows from one second electrode lead 24 to its two neighboring first electrode leads 23, but hardly flows to the remaining first electrode leads 23. Further, even in the case that the first and second electrode leads 23, 24 are provided close to each other, the path of the current into the first electrode lead 23 provided between the one and the other second electrode leads 24 can be reversed by the one and the other second electrode leads 24. Therefore, the current path can be securely split and the effective inductance can be reduced without causing any mutual interference between the second electrode leads 24.

Further, since the four capacitors each comprised of one second electrode lead 24 and the two first electrode leads 26 adjacent thereto are formed by the pair of electrode plates 20a, 20b and the dielectric layer 21, it seems to be a circuit in which four capacitors are connected in parallel. Thus, a low impedance characteristic can be displayed in a wide frequency region by the aforementioned splitting effect and the parallel connection.

Furthermore, by setting the distances D3 between the second external terminal electrodes 26 (or the first external terminal electrodes 25) and their neighboring first external terminal electrodes 25 (or their neighboring second external terminal electrodes 26), i.e., the distances D3 between the second electrode leads 24 (or first electrode leads 23) and their neighboring first electrode leads 23 (or their neighboring second electrode leads 24) equal to each other, the intensities of the currents flowing from the second electrode leads 24 to the first electrode leads 23 are made to be equal to each other, thereby further improving the above splitting effect.

Further, in this case, the main body can be easily mounted on an other substrate since the respective external terminal electrodes 25, 26 are equidistant from each other.

Figure 17A:
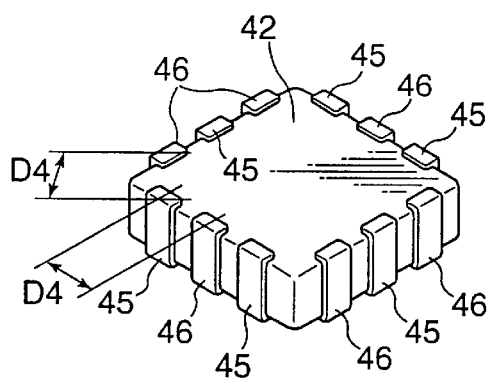
FIGS. 17A to 17C show a fourth capacitor embodying the invention, FIG. 17A being a perspective view showing an outer configuration of the fourth capacitor, FIG. 17B being a plan view showing a first electrode plate of the fourth capacitor, and FIG. 17C being a plan view showing a second electrode plate of the fourth capacitor.
Figure 17B:
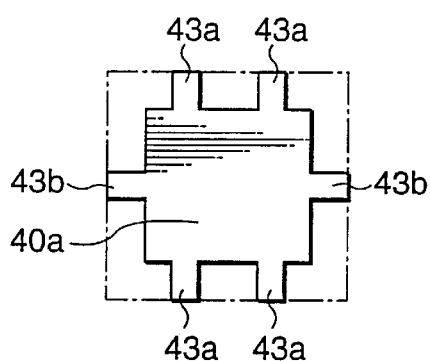
Figure 17C:
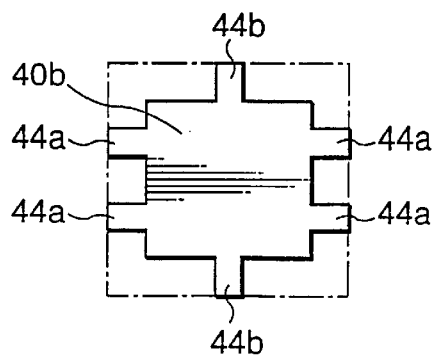

FIGS. 17A to 17C show a multi-layer chip capacitor of thick type according to a fourth embodiment of the invention. The capacitor of the fourth embodiment includes a main body 42 in the form of a square in the plan view, and two first external terminal electrodes 45 provided on each of the opposite sides of the square main body 42, and one second external terminal electrodes 46 provided in the middle of the two first external terminal electrodes 45 on the same side. On each of the other opposite sides of the main body 42, two second external terminal electrodes 46 are provided, and one first external terminal electrodes 45 is provided in the middle of the two second external terminal electrodes 46 on the same side. The distance D4 between each first external terminal electrode 45 and each second external terminal electrode 46 is the same.

Specifically, a first electrode plate 40a has six first electrode leads, two first electrode leads 43a on each of the first opposite sides of the main body 42 and one first electrode lead 43b on each of the second opposite sides of the main body 42, as shown in FIG. 17B. On the other hand, a second electrode plate 40b has six second electrode leads, one second electrode lead 44b on each of the first opposite sides of the main body 42 and two second electrode leads 44a on each of the second opposite sides of the main body 42, as shown in FIG. 17C. In the state where the first electrode plate 40a and the second electrode plate 40b are placed over each other, the second electrode lead 44b comes between the two first electrode leads 43a, and the first electrode lead 43b comes between the two second electrode leads 44a in the plan view so that one first electrode lead is apart away from neighboring second electrode leads in an equal distance.

The material for the first and second electrode plates, dielectric layers and the external terminal electrodes are the same as those used in the second embodiment.

A current splittingly flows into the six first electrode leads 43 via the first external terminal electrodes 45, and flows to its two neighboring second electrode leads 44, but hardly flows to the remaining second electrode leads 44. The current path can be securely split and the effective inductance can be reduced without causing any mutual interference between the first electrode leads 43.

Further, since the six capacitors each comprised of one second electrode lead 44 and the two first electrode leads 43 adjacent thereto are formed by the pair of electrode plates 40a, 40b and the dielectric layer, it seems to be a circuit in which six capacitors are connected in parallel. Accordingly, a low impedance characteristic can be displayed in a wide frequency region by the aforementioned splitting effect and the parallel connection. Moreover, since the distances D4 between the second external terminal electrodes 46 (or the first external terminal electrodes 45) and their neighboring first external terminal electrodes 45 (or their neighboring second external terminal electrodes 46) is equal to each other, the intensities of the currents flowing from the second electrode leads 44 to the first electrode leads 43 are made to be equal to each other, thereby further improving the above splitting effect. In similar to the foregoing embodiments, also, the main body can be easily mounted on an other substrate since the respective external terminal electrodes 45, 46 are equidistant from each other.

Figure 18A:
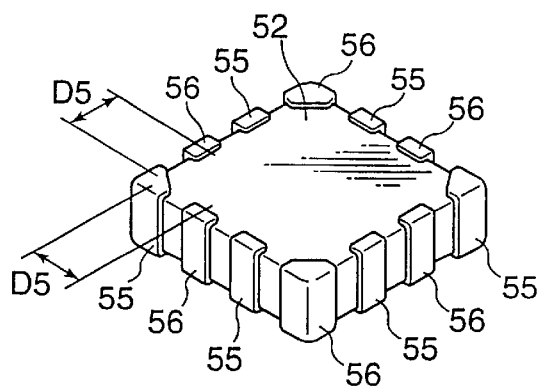
FIGS. 18A to 18C show a fifth capacitor embodying the invention, FIG. 18A being a perspective view showing an outer configuration of the fifth capacitor, FIG. 18B being a plan view showing a first electrode plate of the fifth capacitor, and FIG. 18C being a plan view showing a second electrode plate of the fifth capacitor.
Figure 18B:
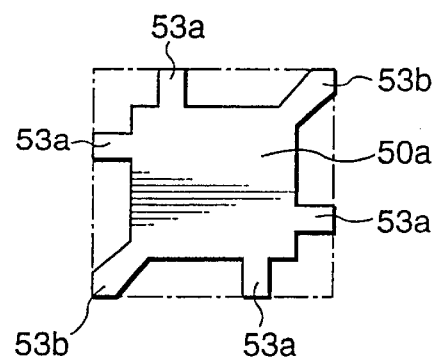
Figure 18C:
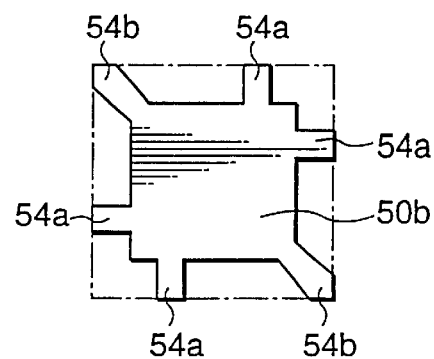

FIGS. 18A to 18C show a multi-layer chip capacitor of thick type according to a fifth embodiment of the invention. The capacitor of the fifth embodiment includes a main body 52 in the form of a square in the plan view. In this embodiment, two first external terminal electrodes 55 are provided on the opposite corners of the main body 52 and four first external terminal electrodes 55 are provided on four sides of the main body 52, respectively. On the other hand, two second external terminal electrodes 56 are provided on the other opposite corners of the main body 52, and four second external terminal electrodes 56 are provided the four sides of the main body 52, respectively. The four first external terminal electrodes 55 provided on the respective four sides of the main body 52 are arranged closer to the second external terminal electrodes 56 provided on the corners whereas the four second external terminal electrodes 56 provided on the respective four sides of the main body 52 are arranged closer to the first external terminal electrodes 55 provided on the corners. In this way, the first external terminal electrodes 55 and the second external terminal electrodes 56 are alternately arranged in the peripheral direction of the main body 52. The distance D5 between one first external terminal electrode 55 and one adjacent second external terminal electrode 56 is the same as that between another first and second external terminal electrodes.

A first electrode plate 50a which is used in the fifth capacitor is shown in FIG. 18B, and a second electrode plate 50b which is used in the fifth capacitor is shown in FIG. 18C. The first electrode plate 50a has four first electrode leads 53a on four sides thereof, and two first electrode leads 53b at the opposite corners thereof. The first electrode leads 53a are arranged near the other opposite corners of the first electrode plate 50a that no electrode leads are provided. Similarly, the second electrode plate 50b has four second electrode leads 54a on four sides thereof, and two second electrode leads 54b at the opposite corners thereof. The second electrode leads 54a are arranged near the other opposite corners of the second electrode plate 50a that no electrode leads are provided. In a state where the first and second electrode plates 50a and 50b are placed one over another, however, the first electrode leads 53b is shifted 90 degrees from the second electrode leads 54b. Further, one first electrode lead 53a comes between second electrode leads 54a and 54b in the plan view with one first electrode lead being apart away from its neighboring second electrode leads in an equal distance.

The material for the first and second electrode plates, dielectric layers and the external terminal electrodes is the same as those used in the second embodiment.

The fifth capacitor, which has the same distances between the first external terminal electrodes 55 and their neighboring second external terminal electrodes 56, can attain the advantageous effects mentioned in the foregoing embodiments.

Figure 19A:
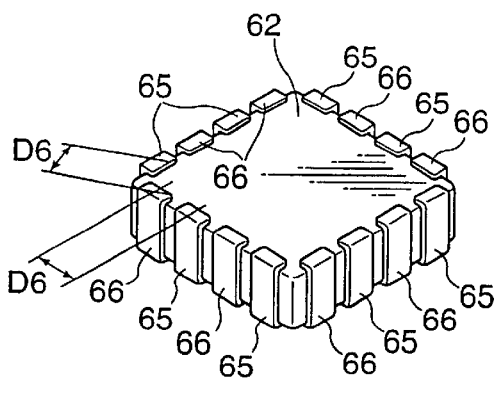
FIGS. 19A to 19C show a sixth capacitor embodying the invention, FIG. 19A being a perspective view showing an outer configuration of the sixth capacitor, FIG. 19B being a plan view showing a first electrode plate of the sixth capacitor, and FIG. 19C being a plan view showing a second electrode plate of the sixth capacitor.
Figure 19B:
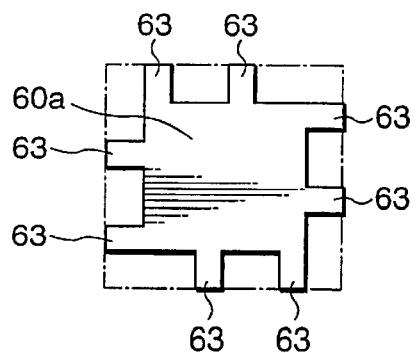
Figure 19C:
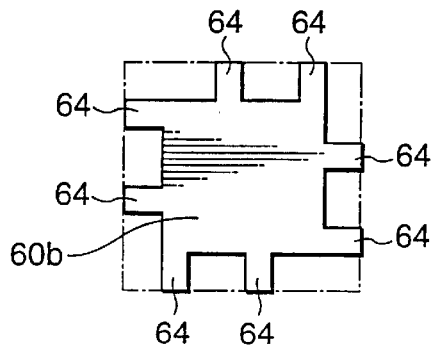

FIGS. 19A to 19C show a multi-layer chip capacitor of thick type according to a sixth embodiment of the invention. The capacitor of the sixth embodiment includes a main body 62 in the form of a square in the plan view. In this embodiment, two first external terminal electrodes 65 and two second external terminal electrodes 66 are provided on each of the four sides of the main body 62. The first and second external terminal electrodes 65 and 66 are alternately arranged in the peripheral direction of the main body 62, and the distance D6 between one first external terminal electrode 65 and one adjacent second external terminal electrode 66 is the same as that between another first and second external terminal electrodes.

A first electrode plate 60a which is used in the sixth capacitor is shown in FIG. 19B, and a second electrode plate 60b which is used in the sixth capacitor is shown in FIG. 19C. The first and second electrode plates 60a and 60b each have two electrode leads 63 and 64 on each of their respective sides. However, the arrangement of the electrode leads 63 of the first electrode plate 60a is symmetrical with that of the electrode leads 64 of the second electrode plate 60b with respect to a line passing a center thereof and in parallel with one side thereof when they are placed over each other. Further, each first electrode lead 63 comes between two second electrode leads 64 in the plan view with one first electrode lead 63 being apart away from its neighboring two second electrode leads 64 in an equal distance.

The material for the first and second electrode plates, dielectric layers and the external terminal electrodes is the same as those used in the second embodiment.

The sixth capacitor, which has the same distances between the first external terminal electrodes 65 and their neighboring second external terminal electrodes 66, can attain the advantageous effects mentioned in the foregoing embodiments.

Figure 20A:
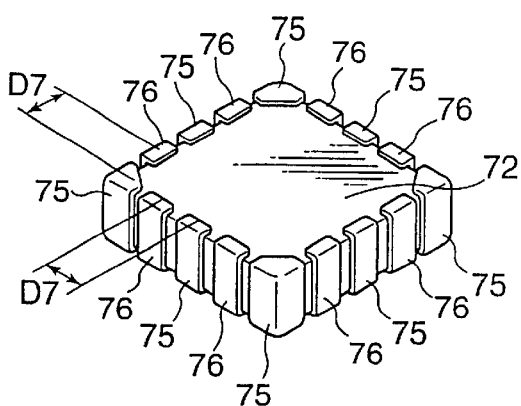
FIGS. 20A to 20C show a seventh capacitor embodying the invention, FIG. 20A being a perspective view showing an outer configuration of the seventh capacitor, FIG. 20B being a plan view showing a first electrode plate of the seventh capacitor, and FIG. 20C being a plan view showing a second electrode plate of the seventh capacitor.
Figure 20B:
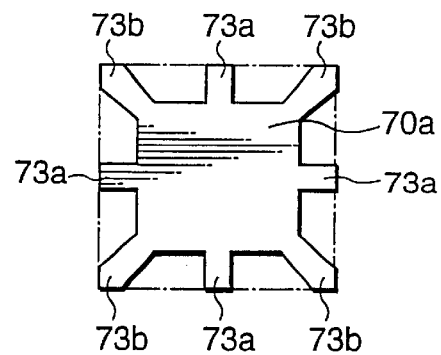
Figure 20C:
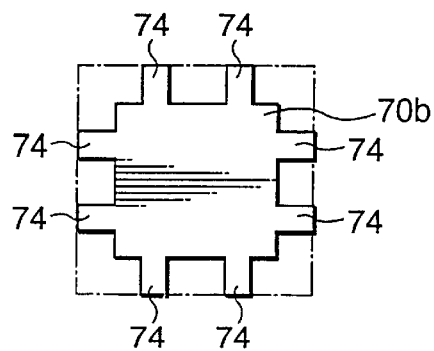

FIGS. 20A to 20C show a multi-layer chip capacitor of thick type according to a seventh embodiment of the invention. The capacitor of the seventh embodiment includes a main body 72 in the form of a square in the plan view. In this embodiment, four first external terminal electrodes 75 are provided on the two opposite corners of the main body 72 and four first external terminal electrodes 75 are provided at respective middle positions of the four sides of the main body 72. On the other hand, two second external terminal electrodes 76 are provided on each of the four sides of the main body 72. The two second external terminal electrodes 76 are arranged on the both sides of the first external terminal electrode 75 on the middle position on the same side. In this way, the first external terminal electrodes 75 and the second external terminal electrodes 76 are alternately arranged in the peripheral direction of the main body 72. The distance D7 between one first external terminal electrode 75 and one adjacent second external terminal electrode 76 is the same as that between another first and second external terminal electrodes.

A first electrode plate 70a which is used in the seventh capacitor is shown in FIG. 20B, and a second electrode plate 70b which is used in the seventh capacitor is shown in FIG. 20C. The first electrode plate 70a has four first electrode leads 73a on the four sides thereof, and four first electrode leads 73b at the four corners thereof. The second electrode plate 70b has two second electrode leads 74 on each of the four sides thereof. In a state where the first and second electrode plates 70a and 70b are placed over each other, one first electrode lead 73a comes between two second electrode leads 74 in the plan view with one first electrode lead being apart away from its neighboring second electrode leads in an equal distance.

The material for the first and second electrode plates, dielectric layers and the external terminal electrodes is the same as those used in the second embodiment.

The seventh capacitor, which has the same distances between the first external terminal electrodes 75 and their neighboring second external terminal electrodes 76, can attain the advantageous effects mentioned in the foregoing embodiments.

According to the invention, the plan views of the capacitor main bodies 4, 12, 22, 42, 52, 62, and 72 are desirably regular polygons, all of whose sides are equal in length. By taking such a shape, the distances between the first external terminal electrodes 5, 15, 25, 45, 55, 65, 75 (or second external terminal electrodes 6, 16, 26, 46, 56, 66, 76) and their neighboring second external terminal electrodes (or their neighboring first external terminal electrodes) become shortest. This makes it easier for a current to flow between them, thereby sufficiently displaying the effect of the parallel connection.

Although the electrode plates 2a, 2b, 10a, 10b, 20a, 20b, 40a, 40b, 50a, 50b, 60a, 60b, 70a, and 70b have a square shape, i.e., the capacitor main bodies 4, 12, 22, 42, 52, 62, 72 are square in plan view, they may have any polygonal shape such as a triangle or pentagon. In order to improve the splitting effect, they desirably have a polygonal shape particularly having four or more sides.

Figure 21:
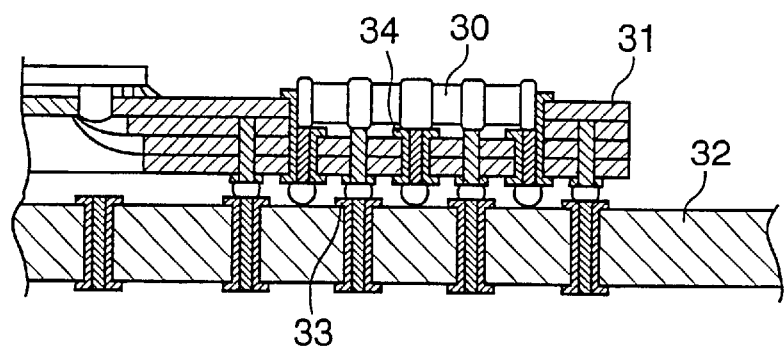
FIG. 21 is a partially sectional view showing a state where a multi-layer chip capacitor is mounted on an IC package.
Figure 22:
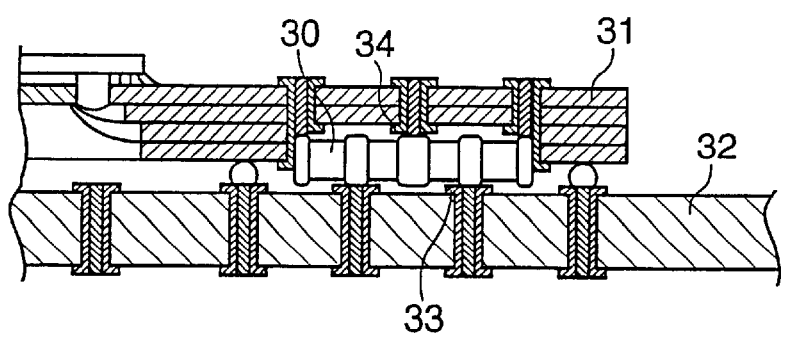
FIG. 22 is a partially sectional view showing a state where a multi-layer chip capacitor is mounted on another IC package.
Figure 23:
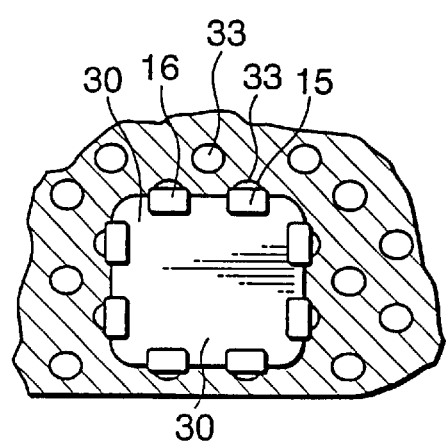
FIG. 23 is a diagram showing a connection of the second capacitor with a circuit board.

Next, mounting of the multi-layer chip capacitors described in the second and third embodiments will be described. FIG. 21 is a partial section showing a state where an IC package 31 having an inventive multi-layer chip capacitor 30 mounted in its upper surface is mounted on a circuit board 32, and FIG. 22 is a partial section showing a state where the IC package 31 having an inventive multi-layer chip capacitor 30 mounted in its lower surface is mounted on another circuit board 32. In either case, the connection between the multi-layer chip capacitor 30 of the second to seventh embodiments and electrode pads 33 of the circuit board 32 or electrode pads 34 of the circuit board 33 is as shown in a plan view of FIG. 23.

Since the first external terminal electrodes connected with the first electrode leads and the second external terminal electrodes connected with the second electrode leads are regularly arranged regardless of the second to seventh multi-layer chip capacitors, it is not necessary to change the wiring of a CPU chip itself, the wiring between the CPU chip and the circuit board and the wiring of the circuit board itself. This eliminates the need for providing unnecessary wiring and lands. As a result, an influence of inductance caused by the wiring between the CPU chip and the capacitor can be reduced as compared to the conventional construction in which the multi-layer chip capacitor is mounted on the circuit board separately from the IC package. Further, since the capacitor is provided in vicinity of the CPU chip, its efficiency as a decoupling capacitor can be improved.

Next, the performance of the above-described inventive capacitors will be described based on actual examples. First, a capacitor of the first embodiment was manufactured and its performance was estimated as Example 1. The respective electrode plates were formed by the high-frequency magnetron sputtering method. First, Ar-gas was admitted as a gas used for sputtering into a process chamber, and the pressure thereof was kept at 6.7 Pa by vacuuming. During sputtering, a substrate holder was moved to a position of a target on which a film is to be formed and a substrate-target distance was fixed at 60 mm.

Subsequently, a high-frequency voltage of 13.56 MHz was applied between the substrate holder and the target by an external high-frequency power supply, and sputtering was applied to the front surface of the target by producing a high-density plasma in vicinity of the target by a magnetic field caused by a permanent magnet disposed on the rear surface of the target.

In Example 1, the plasma was produced by applying the high-frequency voltage only to the target closest to the substrate. The substrate holder is provided a heating mechanism including a heater, and the temperature of the substrate during the film formation by sputtering was so controlled as to be constant. On the target side of the substrate placed on the substrate holder was provided a metal mask having a thickness of 0.1 mm. The substrate was constructed such that a necessary mask according to a pattern of a film to be formed could be set on a surface of the substrate where the film is to be formed.

All the dielectric layers were formed by the sol-gel method. Further, magnesium (Mg) acetate and niobium (Nb) ethoxide were weighed at a mole ratio of 1:2 and dissolved into 1,3-propanediol by reflux (6 hours at about 124° C.) to synthesize a Mg—Nb complex alkoxide solution (Mg=5.0 mmol, Nb=10 mmol, 1,3-propanediol=140 mmol).

Subsequently, 15 mmol of lead acetate was added to the above Mg—Nb complex alkoxide solution and dissolved therein at 60° C. to synthesize $Pb(Mg_{1/3}Nb_{2/3})O_3$ (PMN) precursor solution.

On an alumina substrate having a thickness of 0.25 mm was formed a first electrode plate of Au having a thickness of 0.3 $\mu$m to which the above (PMN) precursor solution was applied by a spin coater. After drying, a heating treatment was applied at about 400° C. for 1 min. to form a gel film.

After repeating the application and heating of the (PMN) precursor solution, the substrate was baked at about 800° C. for 2 min. (in the atmosphere) to obtain a PMN thin film having a thickness of 0.7 $\mu$m which serves as the dielectric layer 3. A perovskite content of the obtained thin film was calculated by the X-ray diffraction. The calculated content was 95%. Thereafter, patterning was applied to the dielectric layer by a photolithography technique.

The second electrode plate of Au was deposited on the front surface of this dielectric layer by sputtering. By changing the sizes of the patterns of the first and second electrode plates, samples in which the distance D1 between the first and second external terminal electrodes were changed as shown in TABLE-1 were formed. Thereafter, a protection film having viaholes was formed using a photosensitive resin. After solder paste was screen-printed in the viaholes, eight solder bumps having a diameter of 0.1 mm were formed together with viahole conductors by reflowing, with the result that a single-plate thin type capacitor as shown in FIGS. 1 to 4 was obtained. The areas of the capacitor main bodies, i.e., the areas of the electrode plates are shown in TABLE-1.

The impedance characteristics of the produced thin film capacitors in a frequency region of 1 MHz to 1.8 GHz were measured using an impedance analyzer (HP4291A of Hewlett Packard) and a microwave probe (manufactured by Pico Probe). The measurement results are shown in TABLE-1. It should be appreciated that, in TABLE-1, electrostatic capacity was a value at 1 MHz and inductance was calculated by $L=1/[(2\pi f_0)^2 \times C]$.

TABLE 1

| SAMPLE No. | DISTANCE D1 (mm) | AREA S (mm²) | Electrostatic Capacity 1 MHz nF | Inductance pH |
|---|---|---|---|---|
| 1 | 0.22 | 0.15 | 6.6 | 20 |
| 2 | 0.42 | 0.62 | 24 | 38 |
| 3 | 0.65 | 1.25 | 58 | 55 |
| 4 | 0.85 | 2.72 | 99 | 68 |
| 5 | 1.1 | 4.63 | 165 | 88 |
| 6 | 1.4 | 7.56 | 268 | 125 |
| 7 | 1.5 | 8.70 | 307 | 155 |

Figure 24:
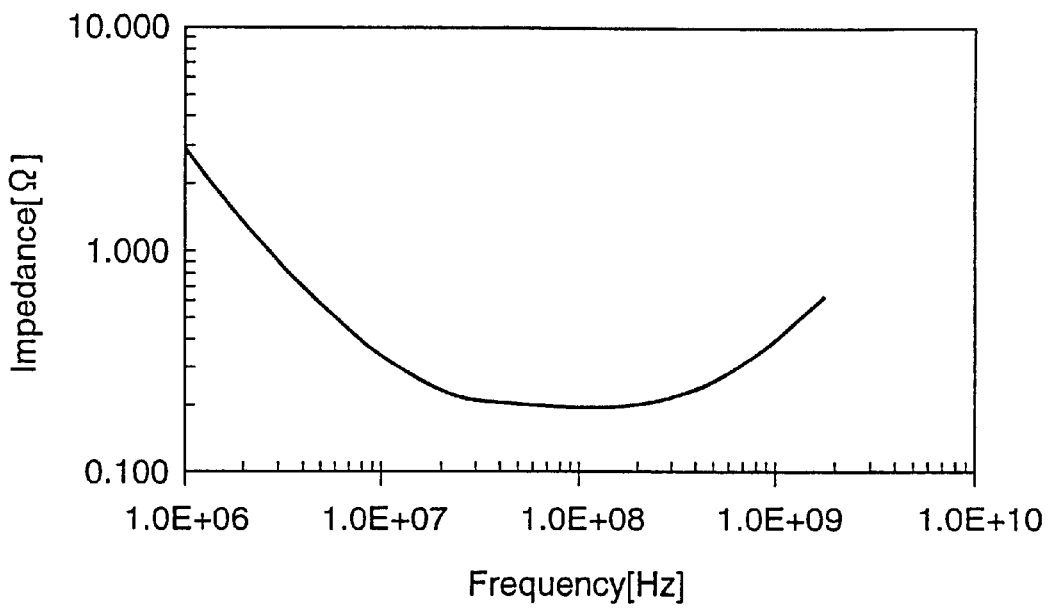
FIG. 24 is a graph showing an impedance characteristic of the first capacitor.

TABLE-1 shows that the shorter the distance D between the first and second external terminal electrodes, the smaller the inductance. FIG. 24 shows an impedance characteristic of sample No. 3 in which the distance D1 between the terminal electrodes is: D1=0.65 mm. This graph shows that a low impedance characteristic is displayed in a wide frequency region.

Further, a capacitor of the third embodiment was manufactured and its performance was estimated as Example 2. Green sheets having a thickness of 10 $\mu$m were formed by the doctor blade method using a slip containing barium titanate as a main component and mixed with a baking auxiliary, a solvent, a dispering agent and a binder.

On the other hand, a commercially available Ag—Pd paste was prepared to form internal electrodes. A conductive film which will become the first electrode plate 20a was formed on one green sheet by screen printing using the Ag—Pd paste. Subsequently, a conductive film which will become the second electrode plate 20b was formed on another green sheet by screen printing using the Ag—Pd paste. Twelve green sheets printed with the conductor film which will become the first electrode plate 20a and twelve green sheets printed with the conductor film which will become the first electrode plate 20b were alternately laminated to construct a total of twenty four plates. Finally, one green sheet printed with no electrode plate was placed on top of the twenty four plates, and thermocompression bonding was applied to the resulting assembly to form a compact. At this stage, by changing the size of the electrode patterns, the distance D3 between the first and second external terminal electrodes 25, 26 (actually distances between the center points of the electrodes) after baking are set as shown in TABLE-2.

After being cut to expose the first and second electrode leads 23, 24, the obtained compact was baked in the atmosphere at 1250° C. for 2 hours. In this way, a main body similar to the one as shown in FIGS. 11 to 15 except that the numbers of the electrode plates and the dielectric layers differ was manufactured.

Figure 11:
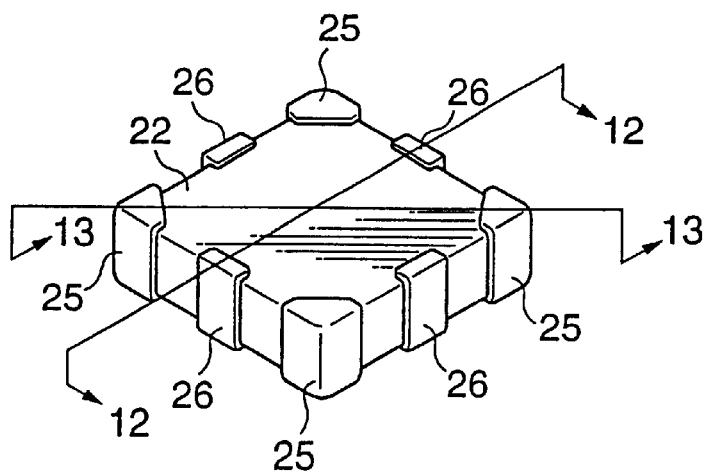
FIG. 11 is a perspective view showing an outer configuration of a third capacitor embodying the invention.
Figure 12:
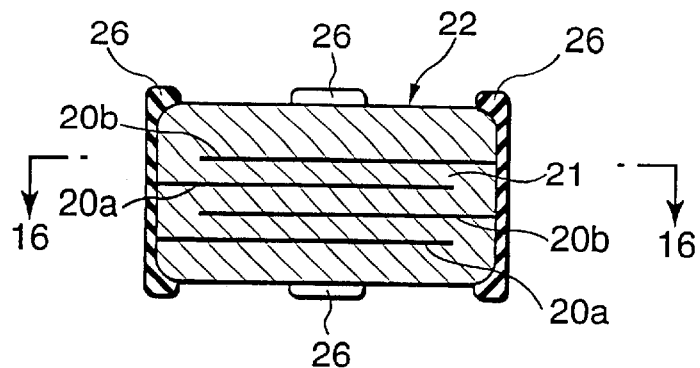
FIG. 12 is a sectional view of the third capacitor, taken along the line 12—12 in FIG. 11.
Figure 13:
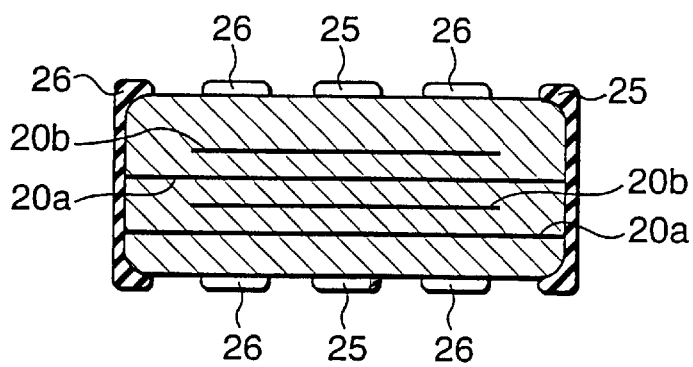
FIG. 13 is a sectional view of the third capacitor, taken along the line 13—13 in FIG. 11.

Thereafter, a conductive Ag—Pd paste was applied to the front, end and rear surfaces of the sides or corners of the main body 22 including the exposed ends of the first and second electrode leads 23, 24 and dried. Then, the main body 22 was baked at 800° C., and a plate was formed on this baked thick type conductor by Ni-solder plating to form the first and second external terminal electrodes 25, 26 as shown in FIG. 11. In this way, a multi-layer chip capacitor was obtained. The respective areas of the capacitor main bodies, i.e., the respective areas of the electrode plates are shown in TABLE-2.

The impedance characteristics of the produced capacitors in a frequency region of 1 MHz to 1.8 GHz were measured using an impedance analyzer (HP4291A of Hewlett Packard) and a microwave probe (manufactured by Pico Probe). The measurement results are shown in TABLE-2. It should be appreciated that, in TABLE-2, electrostatic capacity was a value at 1 MHz and inductance was calculated by $L=1/[(2\pi f_0)^2 \times C]$.

TABLE 2

| SAMPLE No. | DISTANCE D3 (mm) | AREA S (mm$^2$) | Electrostatic Capacity 1 MHz nF | Inductance pH |
|---|---|---|---|---|
| 8 | 0.3 | 0.25 | 22.5 | 30 |
| 9 | 0.42 | 0.55 | 45 | 45 |
| 10 | 0.65 | 1.44 | 106 | 63 |
| 11 | 0.85 | 2.35 | 180 | 78 |
| 12 | 1.1 | 4.41 | 303 | 96 |
| 13 | 1.4 | 7.29 | 490 | 130 |
| 14 | 1.5 | 8.41 | 570 | 175 |

Figure 25:
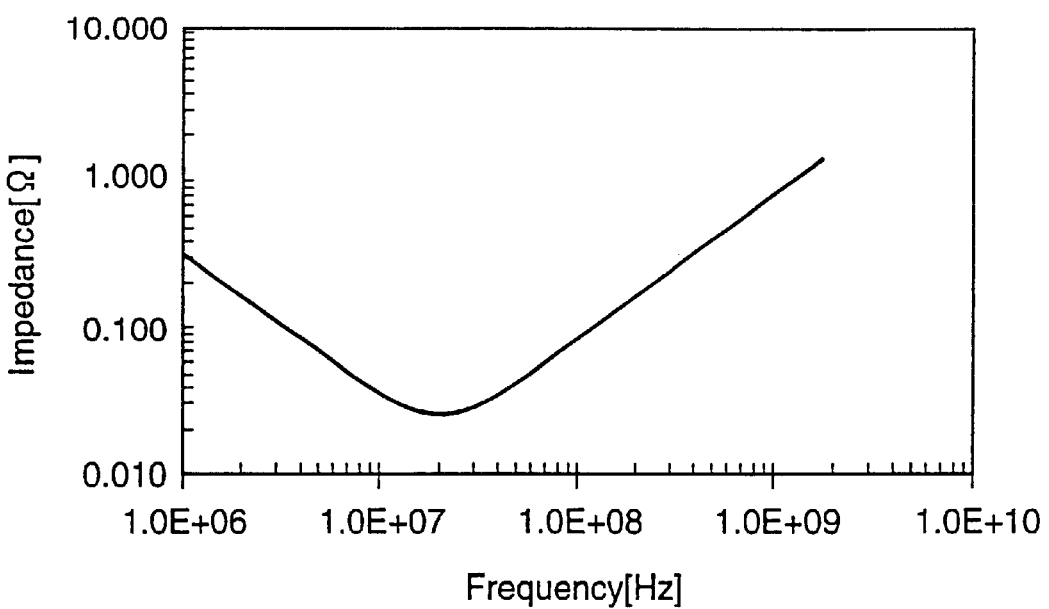
FIG. 25 is a graph showing an impedance characteristic of the third capacitor.

TABLE-2 shows that the shorter the distance D3 between the first and second external terminal electrodes 25, 26, the smaller the inductance. FIG. 25 shows an impedance characteristic of the multi-layer chip capacitor of sample No. 13 which the distance D3 between the terminal electrodes is: D3=1.4 mm. This graph shows that a low impedance characteristic is displayed in a wide frequency region.

As described above, an inventive capacitor comprising a polygonal main body formed by alternately placing first and second electrode plates with a dielectric layer held therebetween, and a plurality of first terminal electrodes connected with the first electrode plate(s) and a plurality of second terminal electrodes connected with the second electrode plate(s) which are alternately formed on the periphery of the capacitor main body.

Either ones of the first and second terminal electrodes may be provided at the corners of the main body, and the other ones thereof may be provided on lines connecting corresponding pairs of the former terminal electrodes. Specifically, in the case that the first terminal electrodes are provided at the corners of the main body, the second terminal electrodes are provided on the lines connecting the corresponding pairs of the first terminal electrodes. On the other hand, in the case that the second terminal electrodes are provided at the corners of the main body, the first terminal electrodes are provided on the lines connecting the corresponding pairs of the second terminal electrodes.

In the case where the first terminal electrode are provided at the corners of the main body, the second terminal electrodes are provided in the middle of the lines connecting corresponding pairs of the first terminal electrodes. In the case where the second terminal electrode are provided at the corners of the main body, the first terminal electrodes are provided in the middle of the lines connecting corresponding pairs of the second terminal electrodes.

Alternatively, the first and second terminal electrodes may be both provided on the sides of the main body. In such a case, it is preferable to provide them such that each first terminal electrode (or each second terminal electrode) is equidistant from its neighboring second terminal electrodes (or its neighboring first terminal electrodes) when viewed in a direction in which the plates are placed one over another.

Since a current flows through two adjacent capacitors in the same direction in the known parallel capacitor disclosed in Japanese Unexamined Patent Publication No. 8-162368, a mutual inductance between the two capacitors becomes larger, with the result that the effects of parallel connection cannot be expected. Although the mutual inductance decreases if the two capacitors are largely spaced apart, this results in a larger size of the capacitor and a larger total inductance. As a result, the effect of parallel connection cannot be obtained in the conventional capacitor.

On the other hand, in the inventive capacitor, a current splittingly flows into a plurality of first terminal electrodes, and further flows from one first terminal electrode to the two closest second terminal electrodes at its both sides. Thus, the current flowing from one first terminal electrode is securely split in two directions.

Specifically, in the case where the first terminal electrodes are provided at the corners of the main body which is rectangular (or square) in its plan view while the second terminal electrodes are provided on lines connecting corresponding pairs of the first terminal electrodes, and a current is supplied through the first terminal electrodes, the current supplied to the first terminal electrodes at the corners of the main body splittingly flows to the second terminal electrodes provided on the two sides forming the corner.

In the case where the first and second electrode terminals are both provided on the sides of the main body and the current is supplied through the first terminal electrodes, the current supplied to the first terminal electrodes on the sides of the main body splittingly flows to the second terminal electrodes provided on the same sides and those on the sides forming the corner with the former sides. Accordingly, the effective inductance can be reduced, and the above construction equivalently forms a circuit in which the plurality of capacitors each comprised of one first terminal electrode and two second terminal electrodes at its both sides are connected in parallel. Therefore, a low impedance characteristic can be displayed in a wide frequency region by the splitting effect and the parallel connection.

In the case where the first and second terminal electrodes are provided close to each other, the current from one first terminal electrode and the other first terminal electrode to the second terminal electrode provided therebetween can be made to flow in opposite directions. Accordingly, the currents can be securely split without causing any mutual interference between the respective terminal electrodes.

In the case where the first terminal electrodes are provided at the corners, the second terminal electrodes can be made equidistant from the corresponding pairs of the first terminal electrodes by being provided in the middle of the lines connecting the corresponding pairs of the first terminal electrodes. This makes the intensity of the current flowing from the first terminal electrodes to the second terminal electrodes equal to each other, thereby further improving the aforementioned splitting effect. Further, since the distances between the terminal electrodes to be connected with the electrode plates are equal, the main body can be easily mounted on an other circuit board.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A capacitor, comprising:
a first electrode plate having the form of a polygon, and a plurality of electrode leads on a periphery thereof;
a dielectric layer placed on the first electrode plate;
a second electrode plate place on the dielectric layer, the second electrode plate having the form of a polygon, and a plurality of electrode leads on a periphery thereof, each of electrode leads of the second electrode plate being spaced apart from each of the electrode leads of the first electrode plate by an equal distance in a peripheral direction in a plan view;
a plurality of first terminal electrodes each connected with one of the plurality of electrode leads of the first electrode plate respectively; and
a plurality of second terminal electrodes each collected with one of the plurality of electrode leads of the second electrode plate, respectively.

2. A capacitor according to claim 1, wherein the first electrode plate has the plurality of electrode leads at corners thereof, and the second electrode plate has the plurality of electrode leads on sides thereof.

3. A capacitor according to claim 1, further comprising another set of a third electrode plate identical to the first electrode plate, a fourth electrode plate identical to the second electrode plate, and a dielectric layer placed between the third and fourth electrode plates, the plurality of electrode leads of the third electrode plate being respectively connected with the first terminal electrodes, and the plurality of electrode leads of the fourth electrode plate being respectively connected with the second terminal electrodes.

4. A capacitor according to claim 1, wherein the first electrode plate has the plurality of electrode leads at corners thereof, and the second electrode plate has the plurality of electrode leads on sides thereof.

5. A capacitor according to claim 1, wherein the first electrode plate is substantially in the form of a square and has four leads at the respective four corners thereof, and the second electrode plate is substantially in the form of a square and has on electrode lead at a middle of each of the four sides thereof.

6. A capacitor according to claim 5, further comprising another set of a third electrode plate identical to the first electrode plate, a fourth electrode plate identical to the second electrode plate, and a dielectric layer placed between the third and fourth electrode plates, the plurality of electrode leads of the third electrode plate being repectively connected with the first terminal electrodes, and the plurality of electrode lead of the fourth electrode plate being respectively connected with the second terminal electrodes.

7. A capacitor according to claim 1, wherein the first electrode plate is substantially in the form of a square and has on electrode lead on each of the four sides thereof, and the second electrode plate is substantially in the form of a square and has on electrode lead on each of the four sides thereof.

8. A capacitor according to claim 7, wherein the first electrode plate further has two electrode leads at opposite two corners, and the second electrode plate further has two electrode leads at opposite two corners.

9. A capacitor according to claim 1, wherein the first electrode plate is substantially in the form of a square and has two electrode leads on each of opposite two sides thereof and one electrode lead on each of the remaining opposite two sides thereof, and the second electrode plate is substantially in the form of a square and has two electrode leads on each of opposite two sides thereof and one electrode lead on each of the remaining opposite two sides thereof.

10. A capacitor according to claim 1, wherein the first electrode plate is substantially in the form of a square and has two electrode leads on each of the four sides thereof, and the second electrode plate is substantially in the form of a square and has two electrode leads on each of the four sides thereof.

11. A capacitor according to claim 1, wherein the first electrode plate is substantially in the form of a square and has one electrode lead at a middle of each of the four sides thereof and four electrode leads at the respective four corners thereof, and the second electrode plate is substantially in the form of a square and has two electrode leads o each of the four side thereof.

12. A capacitor, comprising:
a first electrode plate having substantially the form of a polygon, and a plurality of electrode leads on a periphery thereof;
a first dielectric layer placed on the first electrode plate;
a second electrode plate place on the first dielectric layer, the second electrode plate having the form of a polygon and a plurality of electrode leads on a periphery thereof;
a second dielectric layer placed on the second electrode plate;
a third electrode plate identical to the first electrode plate placed on the second dielectric layer;
a third dielectric layer placed on the third electrode plate;
a fourth electrode plate identical to the second electrode plate placed on the third dielectric layer;
a plurality of first terminal electrodes each connected with one of the plurality of first electrode leads and one of the plurality of the third electrode leads, respectively; and
a plurality of second terminal electrodes each connected with one of the plurality of second electrode leads and one of the plurality of fourth electrode leads, respectively.

13. The capacitor according to claim 12, wherein the first electrode plate has the plurality of electrode leads at corners thereof, and the second electrode plate has the plurality of electrode leads on sides thereof.

14. The capacitor according to claim 12, wherein each electrode lead of the first electrode plate is spaced apart from each electrode lead of the second electrode plate by the same distance in plan view.

15. The capacitor according to claim 14, wherein the first electrode plate has the plurality of electrode leads at corners thereof, and the second electrode plate has the plurality of electrode leads on sides thereof.

16. The capacitor according to claim 12, wherein the first electrode plate is substantially in the form of a square and has four leads, one at each of the corners thereof, and the second electrode plate is substantially in the form of a square and has an electrode lead at a middle of each side thereof.

17. The capacitor according to claim 12, wherein the first electrode plate is substantially in the form of a square and has an electrode lead on each side thereof and the second electrode plate is substantially in the form of a square and has an electrode lead on each side thereof.

18. The capacitor according to claim 17, wherein the first electrode plate further has two electrode leads at opposite two corners, and the second electrode plate further has two electrode leads at opposite two corners.

19. A capacitor according to claim 12, wherein the first electrode plate is substantially in the form of a square and has two electrode leads on each of opposite two sides thereof and one electrode lead on each of the remaining opposite two sides thereof, and the second electrode plate is substantially in the form of a square and has two electrode leads on each of opposite two sides thereof and one electrode lead on each of the remaining opposite two sides thereof.

20. A capacitor according to claim 12, wherein the first electrode plate is substantially in the form of a square and has two electrode leads on each of the four sides thereof, and the second electrode plate is substantially in the form of a square and has two electrode leads on each of the four sides thereof.

21. A capacitor according to claim 12, wherein the first electrode plate is substantially in the form of a square and has one electrode lead at a middle of each of the four sides thereof and four electrode leads at the respective four corners thereof, and the second electrode plate is substantially in the form of a square and has two electrode leads o each of the four side thereof.

* * * * *

UNITED STATES PATENT AND TRADEMARK OFFICE
CERTIFICATE OF CORRECTION

PATENT NO. : 6,282,079 B1
DATED : August 28, 2001
INVENTOR(S) : Nagakari et al.

It is certified that error appears in the above-identified patent and that said Letters Patent is hereby corrected as shown below:

Column 1,
Line 75, change "Akihiro SADAKANE" to -- Akihiro SADAGANE --.

Signed and Sealed this

Fifth Day of March, 2002

*Attest:*

JAMES E. ROGAN
*Attesting Officer*   *Director of the United States Patent and Trademark Office*